(12) United States Patent
Tucker et al.

(10) Patent No.: US 7,546,783 B2
(45) Date of Patent: Jun. 16, 2009

(54) MOTOR VEHICLE SHIFT HANDLE ATTACHMENT

(75) Inventors: Brian R. Tucker, Sterling Heights, MI (US); Calum Beattie, Windsor (CA)

(73) Assignee: GM Global Technology Operations, Inc., Detroit, MI (US)

(*) Notice: Subject to any disclaimer, the term of this patent is extended or adjusted under 35 U.S.C. 154(b) by 607 days.

(21) Appl. No.: 11/281,935

(22) Filed: Nov. 17, 2005

(65) Prior Publication Data
US 2007/0137406 A1 Jun. 21, 2007

(51) Int. Cl.
G05G 1/10 (2006.01)
(52) U.S. Cl. ......................................... 74/543
(58) Field of Classification Search ............... 74/473.1, 74/473.13, 473.3, 473.33, 543, 544, 545, 74/548, 551
See application file for complete search history.

(56) References Cited

U.S. PATENT DOCUMENTS 6,421,881 B1 * 7/2002 Shovlin ........................ 16/441

6,675,670 B2 * 1/2004 Fujiwara et al. ............ 74/473.3

FOREIGN PATENT DOCUMENTS

| DE | 69816827 T2 | 4/2004 |
| EP | 0727595 A2 | 2/1996 |
| EP | 1486702 A2 | 6/2004 |
| JP | 10-175457 A | 6/1998 |

* cited by examiner

Primary Examiner—Vicky A Johnson

(57) ABSTRACT

A shift shaft has a distal end portion characterized by a polygonal head, a pair of cut-outs, and a transverse notch. A shift handle core is characterized by a central bore having a head seat, a pair of ribs and a transverse slot. The distal end portion is received into the central bore, wherein the head seats into the head seat, and wherein the ribs abut a blind terminus of the cut-outs to define an alignment of the slot and notch. A clip engirds a shift handle core, and a portion thereof rests in the slot and notch to resiliently biasably retain the shift handle core on the shift shaft.

5 Claims, 5 Drawing Sheets

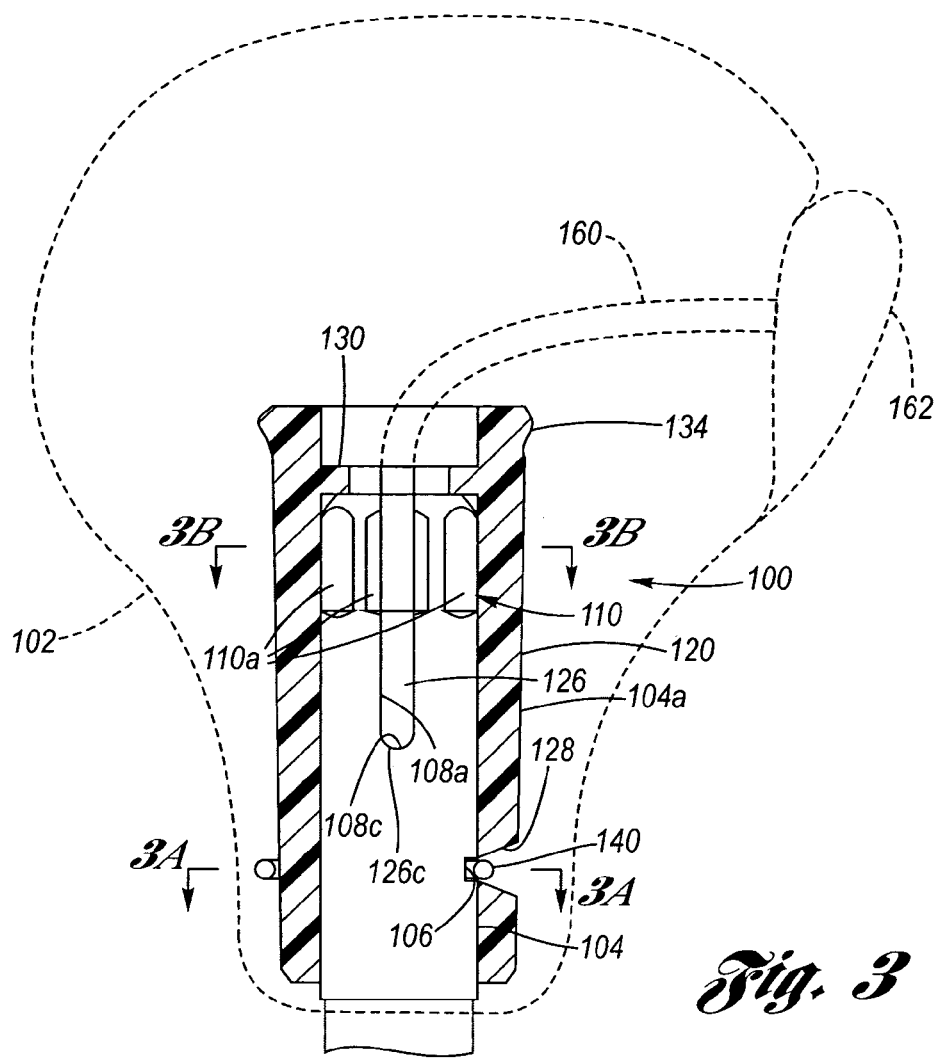
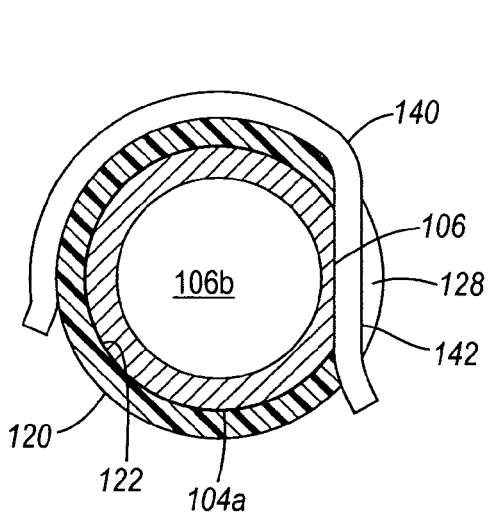
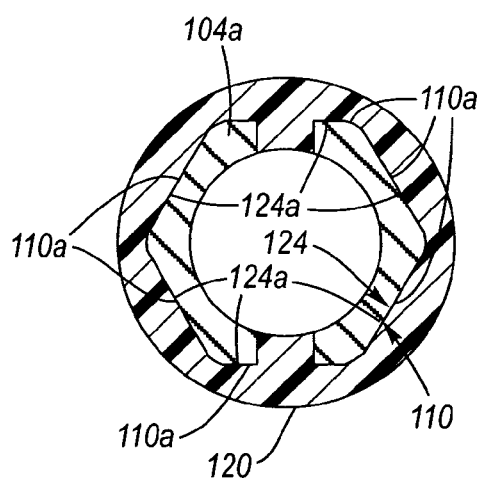

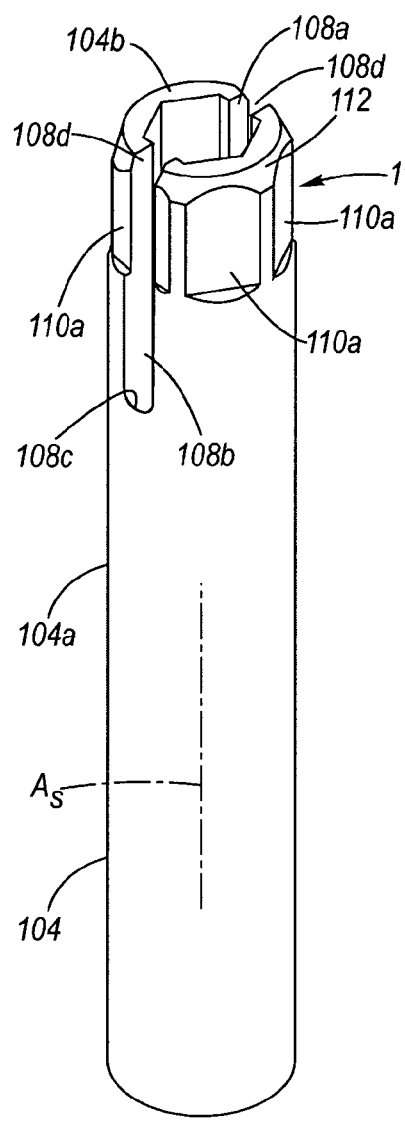
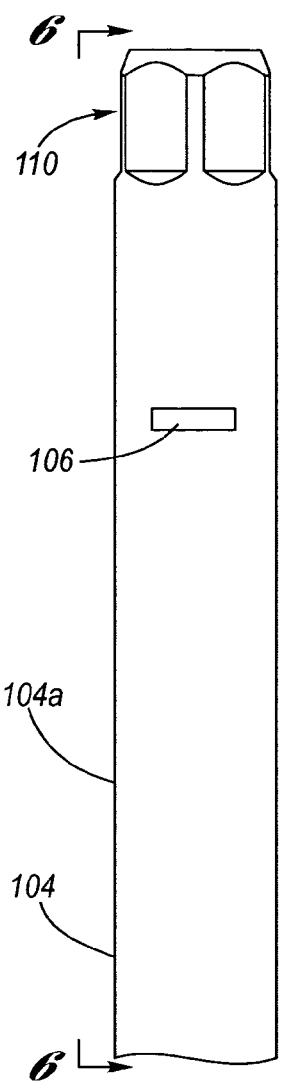
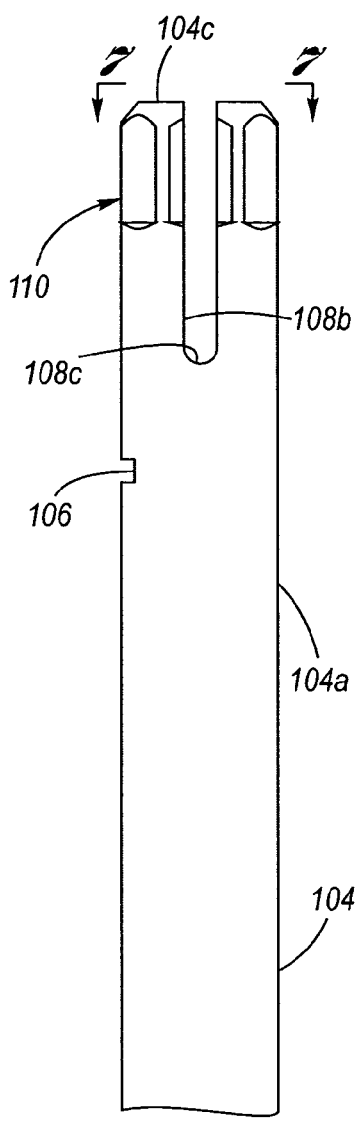
*Fig. 4*     *Fig. 5*     *Fig. 6*
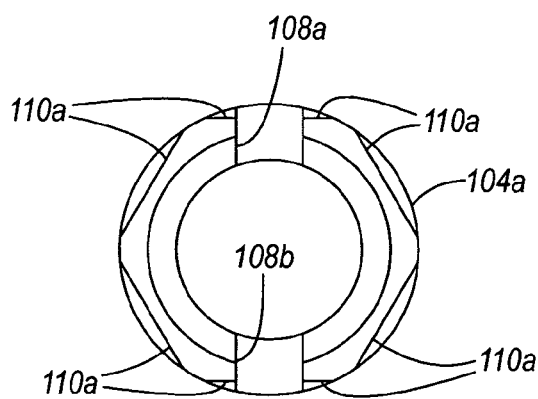
*Fig. 7*

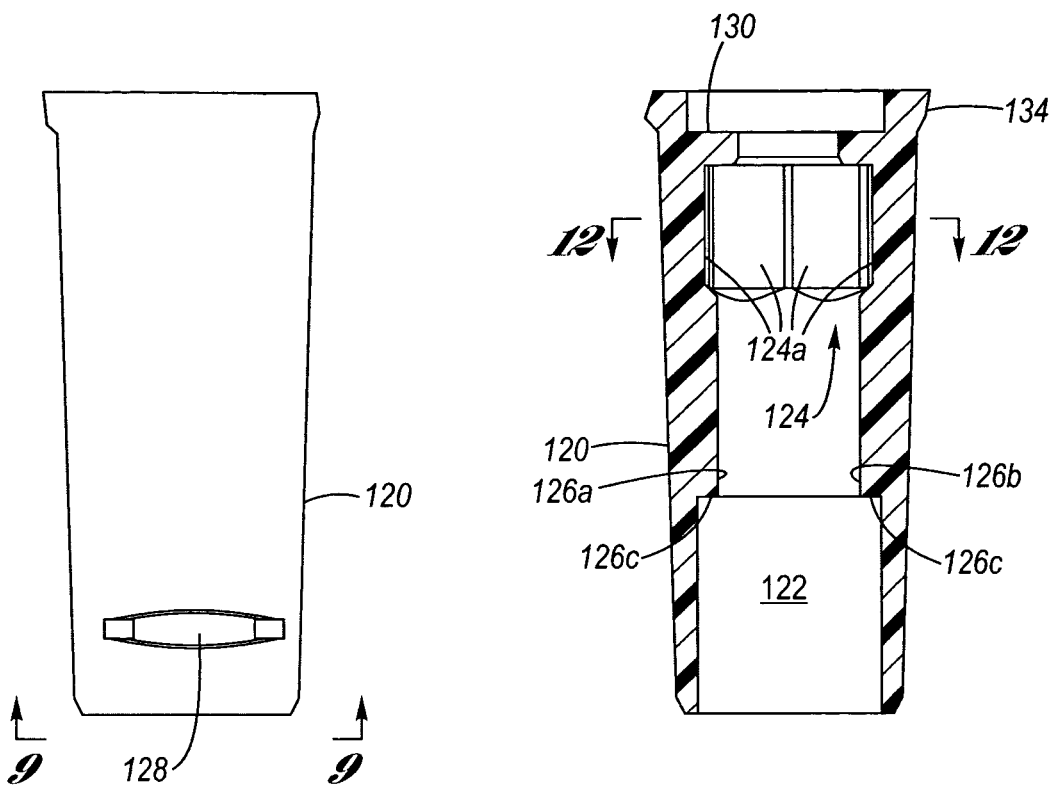
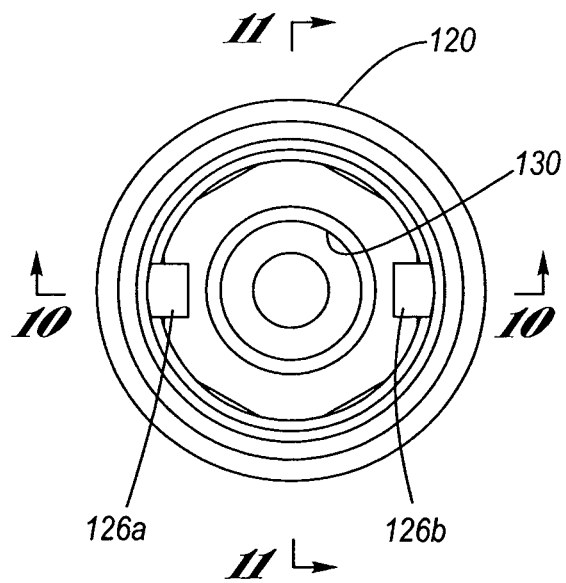

MOTOR VEHICLE SHIFT HANDLE ATTACHMENT

TECHNICAL FIELD

The present invention relates to shift handles used in motor vehicles whereby a driver effects shifting. More particularly, the present invention relates to a snap-fit attachment system between the shift handle and shift shaft of an automatic transmission.

BACKGROUND OF THE INVENTION

As seen at FIGS. 1 and 2, a floor-mounted automatic transmission shift shaft 10 has a shift handle 12 attached at the distal end thereof. A shift release button 14 is movably connected with the shift handle 12, which includes a linkage (not shown) which passes through a hollow passage of the shift shaft and enables the shift shaft to be moved with respect to one or more selected shift positions, as for example out of "park".

FIG. 2 exemplifies a typical prior art attachment 16 of the shift handle 12 to the shift shaft 10. In this exemplification, a threaded fastener 18 (as for example a set screw) passes through a hole in the shift handle and threads into a threaded bore in the shift shaft. One reason a threaded fastener is used in the prior art for attachment is to eliminate any driver perceivable play (i.e., squirm, looseness, or lash) of the shift handle with respect to the shift shaft, particularly parallel to, and rotationally about, the shift shaft axis A. Problematically, prior art attachments of the shift handle to the shift shaft involve loose components and manual build steps, as well as need for cosmetic fascia 20.

Accordingly, what remains needed in the art is an attachment system for shift handles with respect to shift shafts which avoids the problems of the prior art, yet ensures a lack of play between the shift handle and the shift shaft and further provides assured attachment retention which allows for non-destructive removal and replacement of the shift handle with respect to the shift shaft.

SUMMARY OF THE INVENTION

The present invention is a is a snap-fit attachment system for shift handles with respect to shift shafts which avoids the problems of the prior art, yet ensures a lack of play between the shift handle and the shift shaft and further provides assured attachment retention which allows for non-destructive removal and replacement of the shift handle with respect to the shift shaft.

The snap-fit attachment system according to the present invention is characterized by cooperative engagement between a distal end portion of the shift shaft, a shift handle core of a shift handle and a clip.

The distal end portion of the shift shaft has a notch oriented transversely to the shift shaft axis, at least one, preferably a diametrically opposed pair, of cut-outs oriented parallel to the shift shaft axis, and an externally disposed non-circularly shaped head, preferably of a polygonal shape.

The shift handle core has a central bore passing therethrough which is shaped complementary to the distal end portion of the shift shaft so as to snuggly receive therein the distal end portion of the shift shaft. In this regard, at least one rib is formed at the central bore which is oriented parallel to the axis of the central bore, one rib being received into each cut-out of the shift shaft. In this regard further, the central bore has a head seat which is shaped complementary to the non-circularly shaped head of the shift shaft so that the shift handle core cannot rotate with respect to the shift shaft when the shift shaft is received seatingly into the central bore. The shift handle core further has a slot oriented transversely with respect to the axis of the central bore, wherein when the shift shaft is received seatingly into the central bore, the slot aligns with the notch of the shift shaft. Any suitable connection between the shift handle core and a shift handle may be provided.

The clip is resilient and shaped to externally engird the shift handle core, having a generally straight engagement portion which is sized to seat into the aligned slot and notch so as to thereby resiliently retain (by interference) the shift shaft inside the central bore of the shift handle core.

In operation, the clip engirds the shift handle core, wherein the engagement portion thereof is seated into the slot. A shift handle is an integral part of, or is assembled onto, the shift handle core. The central bore is aligned with the shift shaft and the shift shaft is received into the central bore, whereupon the notch aligns with the slot, and the engagement portion of the clip snappingly seats also with respect to the notch. At his moment, the non-circular head of the shift shaft abuts the complementary surface of the head seat of the central bore, and further an end of each rib abuts, respectively, a blind terminus of each cut-out. Any linkage of a shift release button passes through the central bore and of the hollow passage of the shift shaft.

There is no motor vehicle operator discernable play between the shift shaft and the shift handle: parallel to the shift shaft axis, the clip resiliently holds the ribs of the shift handle core firmly in abutment with the blind terminus of the cut-outs; and rotationally about the axis of the shift shaft, the non-circularly shaped head of the shift shaft snuggly abuts the complementarily shaped head seat of the central bore.

In the event, the shift handle needs to be removed from the shift shaft, a technician simply pulls on the shift handle parallel to the shift shaft axis sufficiently to resiliently release the clip from engagement at the notch. Since the engagement portion of the clip will still be seated in the slot, the shift handle may be pushed back onto the shift shaft and the engagement portion will again snappingly be received into the notch when the notch aligns with the slot.

Accordingly, it is an object of the present invention to provide a snap-fit attachment system for shift handles with respect to shift shafts which avoids the problems of the prior art, yet ensures a lack of play between the shift handle and the shift shaft and further provides assured attachment retention which allows for non-destructive removal and replacement of the shift handle with respect to the shift shaft.

This and additional objects, features and advantages of the present invention will become clearer from the following specification of a preferred embodiment.

BRIEF DESCRIPTION OF THE DRAWINGS

FIG. 3 is a partly sectional side view of the snap-fit attachment system according to the present invention, wherein a shift handle is shown operationally in phantom.

FIG. 3A is a partly sectional view seen along line 3A-3A of FIG. 3.

FIG. 3B is a sectional view seen along line 3B-3B of FIG. 3.

FIG. 4 is a perspective view of a distal end portion of a shift shaft according to the present invention.

FIG. 5 is a side elevational view of the distal end portion of the shift of FIG. 4.

FIG. 6 is a side view seen along line 6-6 of FIG. 5.

FIG. 7 is an end view seen along line 7-7 of FIG. 6.

FIG. 8 is a side elevational view of a shift handle core according to the present invention.

FIG. 9 is a bottom elevational view seen along line 9-9 of FIG. 8.

FIG. 10 is a sectional view seen along line 10-10 of FIG. 9.

DESCRIPTION OF THE PREFERRED EMBODIMENT

Figure 1:
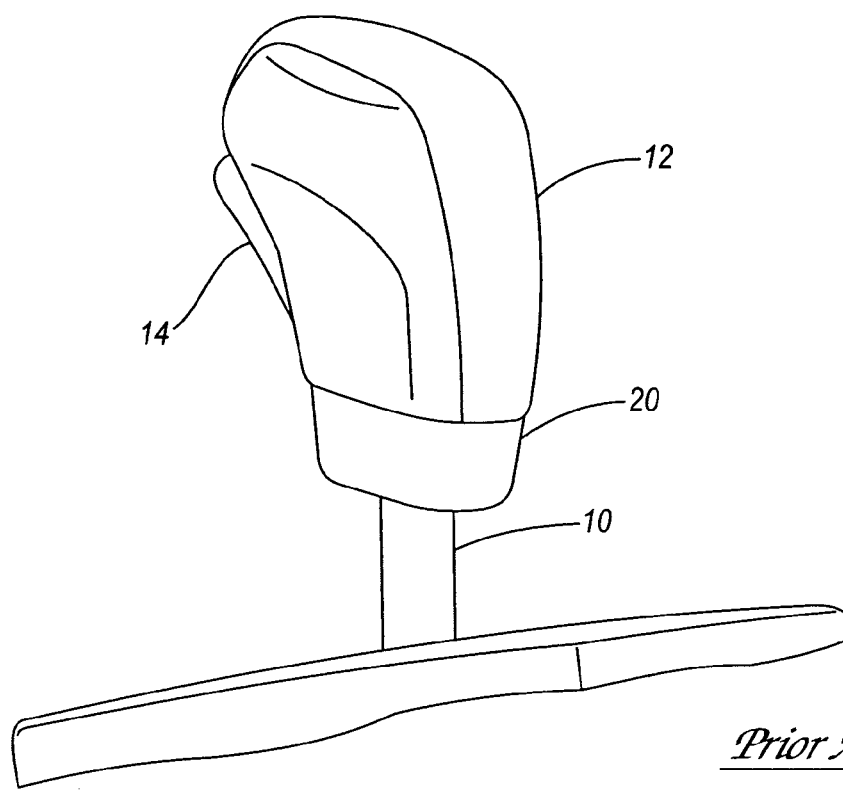
FIG. 1 is a perspective view of a shift lever and shift handle attached thereto according to the prior art.
Figure 2:
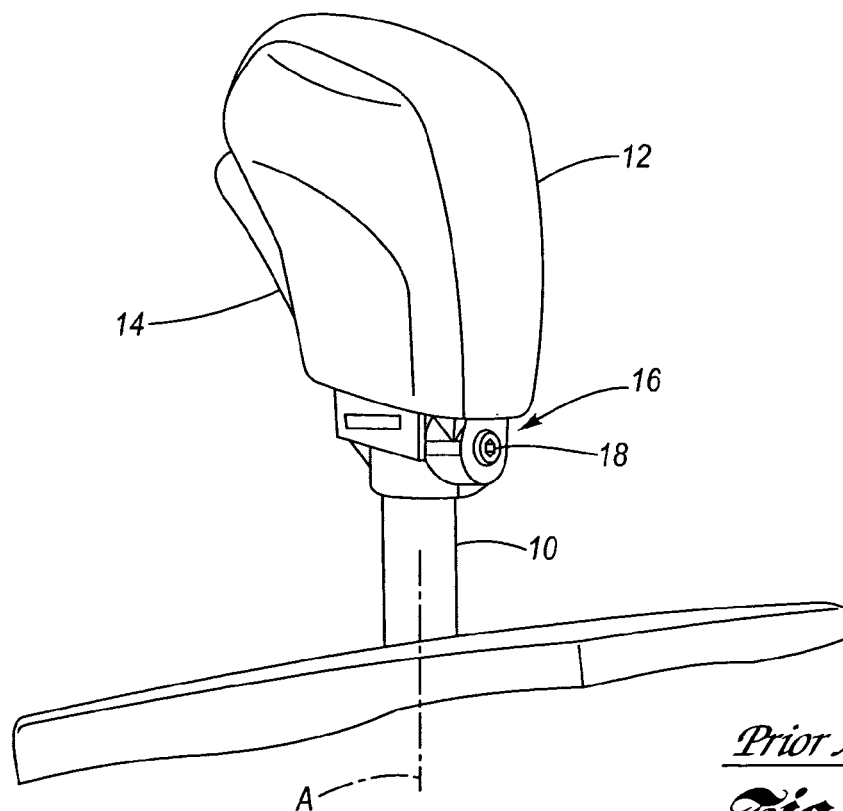
FIG. 2 is a perspective view similar to FIG. 1, wherein now a fascia component is removed to show the prior art attachment between the shift shaft and shift handle.
Figure 11:
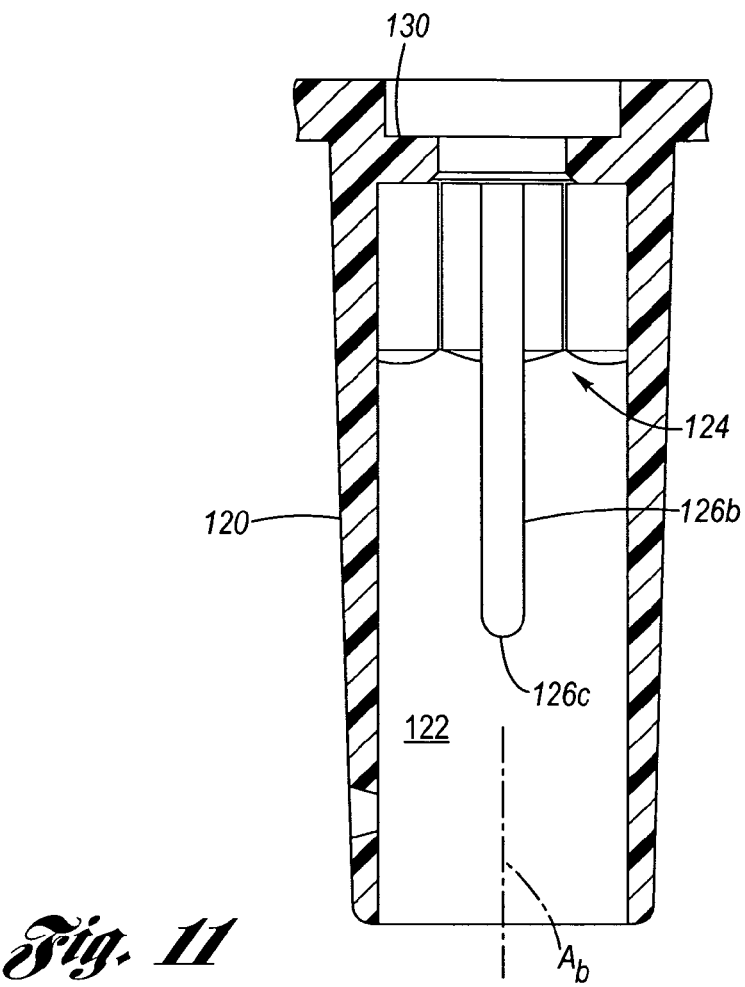
FIG. 11 is a sectional view seen along line 11-11 of FIG. 9.

Referring now to the Drawing, FIGS. 3 through 13 depict various aspects of a snap-fit attachment system 100 for snappingly attaching a shift handle 102 to a shift shaft 104 without assemblage via loose pieces, wherein there is a lack of play between the shift handle and the shift shaft and wherein the shift handle is non-destructibly removable and replaceable with respect to the shift shaft.

As shown at FIGS. 3 through 7, the distal end portion 104a of the shift shaft 104 has a notch 106 formed therein oriented transversely to the shift shaft axis $A_s$. It is preferred that the notch 106 not communicate with the hollow passage 106b within the shift shaft 104, as best shown at FIG. 3A. A diametrically opposed pair of cut-outs 108a, 108b is formed in the shift shaft extending from the shaft end 104c of the shift shaft in the form of an open mouth 108d to a blind terminus 108c. Each cut out 108a, 108b is oriented parallel to the shift shaft axis $A_s$ (see FIG. 4). It is to be noted that more or less than two cut-outs may be provided, although a pair of mutually diametrically opposed cut-outs is preferred.

Adjacent the shaft end 104c of the shift shaft 104 is formed head 110 of non-circular shape, preferably a polygon defined by a plurality of faces 110a, it being noted that other non-circular shapes may be provided in lieu of a polygonal shape (which is preferred), as for example an elliptical shape. A most preferred polygon for the head 110 is a hexagon, wherein each of the cut-outs 108a, 108b bisects a respective face 110a of the head 110 (see FIG. 3B). It is preferred to provide beveling 112 between the head 110 and the shaft end 104c of the shift shaft 104.

As shown at FIGS. 3 through 3B and 8 through 12, a shift handle core 120 has a central bore 122 passing entirely therethrough. The central bore 122 has a shape which is complementary to the distal end portion 104a of the shift shaft 104. As best understood by simultaneous reference to FIGS. 3, 3B, 7 and 12, the head 110 is complementarily reproduced at a head seat 124 of the central bore 122 (see particularly FIG. 3B), whereby when the distal end portion 104a of the shift shaft 104 is received into the central bore there is a snug fit relationship therebetween, particularly a flat abutting relationship between the faces 110a of the head 110 and the faces 124a of the head seat 124 such that the shift handle core is thereby held rotatably stationary with respect to the shift shaft.

A pair of diametrically opposed ribs 126a, 126b is formed in the central bore, wherein there is one rib for each cut-out, respectively. Each rib 126a, 126b, is oriented parallel to the bore axis $A_b$ of the central bore 122 (see FIG. 11). Each rib 126a, 126b is received, respectively, into each cut-out 108a, 108b, wherein there is one rib for each cut out, respectively.

The shift handle core 120 has a slot 128 which cuts therethrough so as to communicate with the central bore 122, wherein the slot is oriented transversely with respect to the axis $A_b$ of the central bore. The notch 106 of the shift shaft 104 and the slot 128 of the shift handle core 120 are mutually located such that when the distal end portion 104a of the shift shaft is received seatingly into the central bore, the slot aligns with the notch.

An annular flange 130 is located adjacent the head seat 124. Although the end 104d of the shift shaft 104 may abut the annular flange 130 so as to serve an axial locating function between the shift shaft and the shift handle core, this is not preferred. It is preferred for axial location between the shift shaft and the shift handle core to be provided by the ends 126c of the ribs 126a, 126b abutting the blind terminus 108c of the cut-outs 108a, 108b, wherein it is this axial location whereat and whereby the notch aligns with the slot when the distal end portion 104a of the shift shaft is seatingly received in the central bore 122.

The shift handle core 120 is either integrally formed with the shift handle 102, or the shift handle is assembled thereonto. The shape of the shift handle core can be any shape to facilitate interconnection with the shift handle, as for example alluded to merely by way of exemplification by break-away 134.

Figures 12, 13:
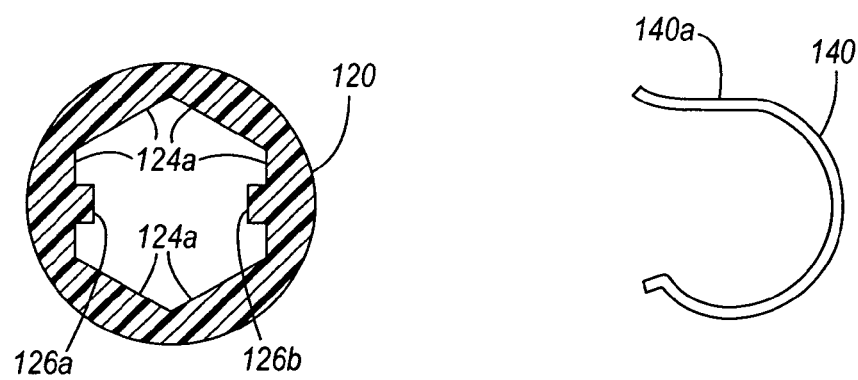
FIG. 12 is a sectional view seen along line 12-12 of FIG. 10.
FIG. 13 is a top plan view of a clip according to the present invention.

A resilient clip 140, shown at FIGS. 3, 3A and 13, externally engirds the shift handle core 120, wherein the clip has a generally straight engagement portion 142 which is sized to seat into the aligned slot 128 and notch 106 so as to thereby interferingly retain the distal end portion 104a of the shift shaft in resiliently fixed axial position with respect to the shift handle core 120.

In operation, the clip 140 is placed engirdly upon the shift handle core, wherein the engagement portion 140 thereof is seated into the slot 106. A shift handle 102 is either integrally formed with or assembled onto the shift handle core. The central bore 122 is aligned with the shift shaft 104 and the distal end portion 104a thereof is received into the central bore and the ribs pass into the cut-outs via the open mouths 108d. Upon seating, the notch aligns with the slot, and the engagement portion of the clip seats also with respect to the notch. At his moment, the non-circular head 124 of the shift shaft abuts the complementary surface of the head seat of the central bore, and further an end 126c of each rib 126a, 126b abuts, respectively, the blind terminus 108c of each cut-out 108a, 108b. Any linkage 160 of a shift release button 162 of the shift handle passes through the central bore and of the hollow passage of the shift shaft.

There is no play between the shift shaft and the shift handle to discernable to the driver in that: 1) parallel to the shift shaft axis $A_s$, the clip holds the ribs of the shift handle core firmly in resiliently biased abutment with the blind terminus of the cut-outs; and 2) rotationally about the axis of the shift shaft, the non-circularly shaped head of the shaft snuggly abuts the complementarily shaped head seat of the central bore.

In the event, the shift handle needs to be removed from the shift shaft, a technician simply pulls on the shift handle parallel to the shift shaft axis sufficiently to resiliently release the clip from engagement at the notch. Since the engagement portion of the clip will still be seated in the slot, the shift handle may be pushed back onto the shift shaft and the engagement portion will again snappingly be received into the notch when the notch aligns with the slot.

To those skilled in the art to which this invention appertains, the above-described preferred embodiment may be subject to change or modification. Such change or modification can be carried out without departing from the scope of the invention, which is intended to be limited only by the scope of the appended claims.

The invention claimed is:

1. A shift handle attachment system, comprising:
   a shift shaft having a distal end portion and a shaft axis, said distal end portion comprising a non-circularly shaped head adjacent a shaft end of said distal end portion;
   a shift handle core having a central bore therethrough, said central bore having a bore axis, a head seat being formed in said central bore which is complementarily shaped with respect to said non-circularly shaped head for abuttingly receiving said head seatingly therein;
   a shift handle interconnected with said shift handle core;
   a resilient interconnection between said shift shaft and said shift handle core which biasably retains, in a direction parallel to said shaft axis, said distal end portion of said shift shaft seatingly received by said central bore, wherein said resilient interconnection comprises:
      a notch formed in said shift shaft, said notch being oriented transversely with respect to said shaft axis;
      a slot formed in said shift handle core, said slot passing through said shift handle core and being oriented transversely with respect to said bore axis; and
      a clip disposed within said shift handle and having an engagement portion which is resiliently disposed in said slot;
      wherein when said shift shaft is seated in said central bore, said notch aligns with said slot and said engagement portion is resiliently disposed in both said notch and said slot;
   at least one cut-out formed in said shift shaft, said at least one cut-out being oriented parallel to said shaft axis, said at least one cut-out being open at said end of said distal end portion and having an oppositely disposed blind terminus; and
   at least one rib, one said rib for each said cut-out, respectively, disposed in said central bore of said shift handle core, said at east one rib being oriented parallel to said bore axis;
   wherein when said distal end portion of said shift shaft is seated in said central bore, each said rib is received by a respective said cut-out; and
   wherein when said distal end portion of said shift shaft is seated in said central bore, said head abuts said head seat such that said shift handle core is prevented from rotating about said shaft axis independently of said shift shaft.

2. The attachment system of claim 1, wherein said non-circular head comprises a polygonal head; and wherein said head seat comprises a polygonal shape complimentary to said polygonal head.

3. The attachment system of claim 1, wherein the alignment of said notch with said slot is defined by an end of each said rib abutting the blind terminus of its respective said cut-out.

4. The attachment system of claim 3, wherein said at least one cut-out comprises two cut-outs diametrically disposed relative to each other; and wherein said at least one rib comprises two ribs diametrically disposed relative to each other.

5. The attachment system of claim 4, wherein said non-circular head comprises a polygonal head; wherein said head seat comprises a polygonal shape complimentary to said polygonal head.

* * * * *